United States Patent [19]

Beasley

[11] Patent Number: 4,682,282
[45] Date of Patent: Jul. 21, 1987

[54] MINIMUM LATENCY TIE-BREAKING ARBITRATION LOGIC CIRCUITRY

[75] Inventor: Michael W. Beasley, Owens Cross Roads, Ala.

[73] Assignee: Unisys Corp., Detroit, Mich.

[21] Appl. No.: 664,468

[22] Filed: Oct. 25, 1984

[51] Int. Cl.$^4$ .......................... G06F 3/00; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,222,647 | 12/1965 | Strachey | 364/200 |
| 3,543,242 | 7/1967 | Adams, Jr. et al. | 364/200 |
| 4,099,255 | 7/1978 | Stanley et al. | 364/200 |
| 4,151,598 | 4/1979 | Webster | 364/900 |
| 4,161,779 | 7/1979 | Spencer et al. | 364/200 |

Primary Examiner—Archie E. Williams, Jr.
Assistant Examiner—William G. Niessen
Attorney, Agent, or Firm—Nathan Cass; Kevin R. Peterson; Edmund M. Chung

[57] ABSTRACT

Arbitration apparatus provides first-come-first-served access for a plurality of requestors to a commonly shared unit, such as a memory. Each requestor is provided with a counter which is advanced each cycle from an initial count until its respective requestor is granted access. During each cycle, fast programmable array combinational selection logic operates in response to the counter outputs to select the requestor which has been waiting the longest. Tie-breaking combinational logic is additionally provided for resolving ties. The speed of operation of the combinational selection logic and the combinational tie-breaking logic is chosen so that requestors can be granted access at a rate of one per cycle.

13 Claims, 6 Drawing Figures

| CNTR 15-1 | | CNTR 15-2 | | S-1 | S-2 |
|---|---|---|---|---|---|
| A | B | C | D | | |
| 0 | 0 | 0 | 0 | 1 | 1 |
| 0 | 0 | 0 | 1 | 1 | 0 |
| 0 | 0 | 1 | 0 | 1 | 0 |
| 0 | 0 | 1 | 1 | 1 | 0 |
| 0 | 1 | 0 | 0 | 0 | 1 |
| 0 | 1 | 0 | 1 | 0 | 0 |
| 0 | 1 | 1 | 0 | 1 | 0 |
| 0 | 1 | 1 | 1 | 1 | 0 |
| 1 | 0 | 0 | 0 | 0 | 1 |
| 1 | 0 | 0 | 1 | 0 | 1 |
| 1 | 0 | 1 | 0 | 0 | 0 |
| 1 | 0 | 1 | 1 | 1 | 0 |
| 1 | 1 | 0 | 0 | 0 | 1 |
| 1 | 1 | 0 | 1 | 0 | 1 |
| 1 | 1 | 1 | 0 | 0 | 1 |
| 1 | 1 | 1 | 1 | 0 | 0 |

Fig. 6

| CYCLE COUNT | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| CLOCK | ⎍ | ⎍ | ⎍ | ⎍ | ⎍ | ⎍ | ⎍ | ⎍ | ⎍ | ⎍ | ⎍ | ⎍ | ⎍ | ⎍ |
| REQ-1 | X | X | — | — | — | — | X | X | — | — | X | X | X | — |
| CNTR 115-1 | 0 | 1 | 0 | 0 | 0 | 0 | 0 | 1 | 0 | 0 | 0 | 1 | 2 | 0 |
| S-1 | — | X | — | — | — | — | — | X | — | — | — | — | X | — |
| Gr-1 | — | X | — | — | — | — | — | — | — | — | — | — | X | — |
| F-1 | 1 | 1 | 0 | 1 | 1 | 1 | 1 | 1 | 0 | 1 | 1 | 1 | 1 | 0 |
| REQ-2 | — | — | X | X | — | — | X | X | X | — | — | — | — | — |
| CNTR 115-2 | 0 | 0 | 0 | 1 | 0 | 0 | 0 | 1 | 2 | 0 | 0 | 0 | 0 | 0 |
| S-2 | — | — | — | X | — | — | — | — | X | — | — | — | — | — |
| Gr-2 | — | — | — | X | — | — | — | — | X | — | — | — | — | — |
| F-2 | 1 | 1 | 1 | 1 | 0 | 1 | 1 | 1 | 1 | 0 | 1 | 1 | 1 | 1 |
| REQ-3 | — | — | — | — | — | — | X | X | X | — | — | — | — | — |
| CNTR 115-3 | 0 | 0 | 0 | 0 | 0 | 0 | 0 | 1 | 2 | 3 | 0 | 0 | 0 | 0 |
| S-3 | — | — | — | — | — | — | — | X | — | — | — | — | — | — |
| Gr-3 | — | — | — | — | — | — | — | — | — | X | — | — | — | — |
| F-3 | 1 | 1 | 1 | 1 | 1 | 1 | 1 | 1 | 1 | 0 | 1 | 1 | 1 | 1 |
| REQ-4 | — | — | X | X | X | — | X | X | X | X | X | — | — | — |
| CNTR 115-4 | 0 | 0 | 0 | 1 | 2 | 0 | 0 | 1 | 2 | 3 | 4 | 0 | 0 | 0 |
| S-4 | — | — | — | X | — | — | — | X | X | — | — | — | — | — |
| Gr-4 | — | — | — | — | X | — | — | — | — | X | — | — | — | — |
| F-4 | 1 | 1 | 1 | 1 | 1 | 0 | 1 | 1 | 1 | 1 | 0 | 1 | 1 | 1 |
| REQ-5 | — | — | — | — | — | — | X | X | X | X | X | — | — | — |
| CNTR 115-5 | 0 | 0 | 0 | 0 | 0 | 0 | 0 | 1 | 2 | 3 | 4 | 5 | 0 | 0 |
| S-5 | — | — | — | — | — | — | — | X | X | X | X | — | — | — |
| Gr-5 | — | — | — | — | — | — | — | — | — | — | X | — | — | — |
| F-5 | 1 | 1 | 1 | 1 | 1 | 1 | 1 | 1 | 1 | 1 | 1 | 0 | 1 | 1 |

MINIMUM LATENCY TIE-BREAKING ARBITRATION LOGIC CIRCUITRY

BACKGROUND OF THE INVENTION

This invention relates generally to data processing control apparatus, and more particularly to improved arbitration means and methods for controlling and sequencing access by a plurality of requestors to a commonly used unit, channel, or service. The plurality of requestors may typically be a plurality of data processors and the commonly used unit may typically be a memory which is used by each processor. As is well known, the manner in which access is provided between the memory and these processors can have a very significant affect on system performance.

A typical prior art arbitration situation is shown in FIG. 1 which illustrates a plurality of processors P-1 to P-N which provide respective request signals Req-1 to Reg-N that are applied to arbitration circuitry 10 for determining which processor is to be granted access by activating one of the arbitration grant outputs Gr-1 to Gr-N respectively corresponding to request signals Reg-1 to Req-N. Since any or all of the input request signals Req-1 to Req-N can be active at a time, the purpose of the arbitration circuitry 10 is to determine which request is to be serviced next if more than one request is active at the same time.

There are various ways known in the art for designing the arbitration circuitry 10 in FIG. 1 for controlling and sequencing the granting of access in response to the input request signals Req-1 to Req-N. For example, one known arbitration approach involves sequentially polling the request signals in some desired order and grafting access whenever a request signal is found to be activated.

In certain systems, such as in a real-time data processing system, it is important to provide an arbitration approach which maximizes the accessibility by all requesting processors while also providing minimum latency for each individual requesting processor. Known arbitration approaches have not been able to satisfactorily meet these requirements.

SUMMARY OF THE INVENTION

In accordance with the present invention, a first come-first served arbitration approach is employed which not only ensures minimum latency for each individual requesting processor, but which also can be implemented in a manner which provides unusually fast operation while also incorporating the capability of resolving any ties occurring between requesting processors.

The specific nature of the invention as well as its objects, advantages, features and uses will become apparent from the following detailed description taken in conjunction with the accompanying drawings.

·DESCRIPTION OF THE DRAWINGS

FIG. 6 is a timing diagram illustrating an example of typical operation of the embodiment of FIG. 5.

DETAILED DESCRIPTION OF THE INVENTION

Like numerals and characters refer to like elements throughout the figures of the drawings.

Figure 1:
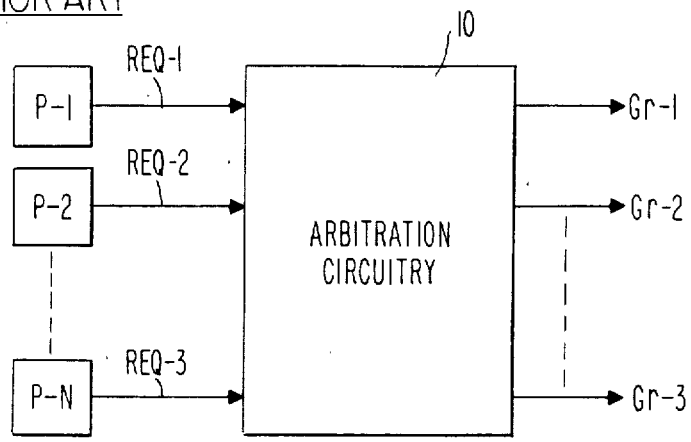
FIG. 1 is a block diagram generally illustrating how arbitration is typically provided for a plurality of requestors in the prior art.

For the purposes of this description it will be assumed that the invention is applied to a synchronous data processing system in which all of the processor request signals Req-1 to Req-N in FIG. 1 are valid when sampled by the rising edge of a clock pulse C provided during each cycle. It will also be assumed that the shared unit being requested by the processors P-1 to P-N is a memory.

In the preferred embodiment it has been found advantageous to select the access time of the memory in conjunction with the operating time of the arbitration circuitry 10 so as to allow multiple requests to be satisfied at a rate of one per clock cycle. It will thus be appreciated that it is most important that the arbitration circuitry 10 be able to award access as fast as possible in order to provide high speed memory accessing for the requesting processors.

Figure 2:
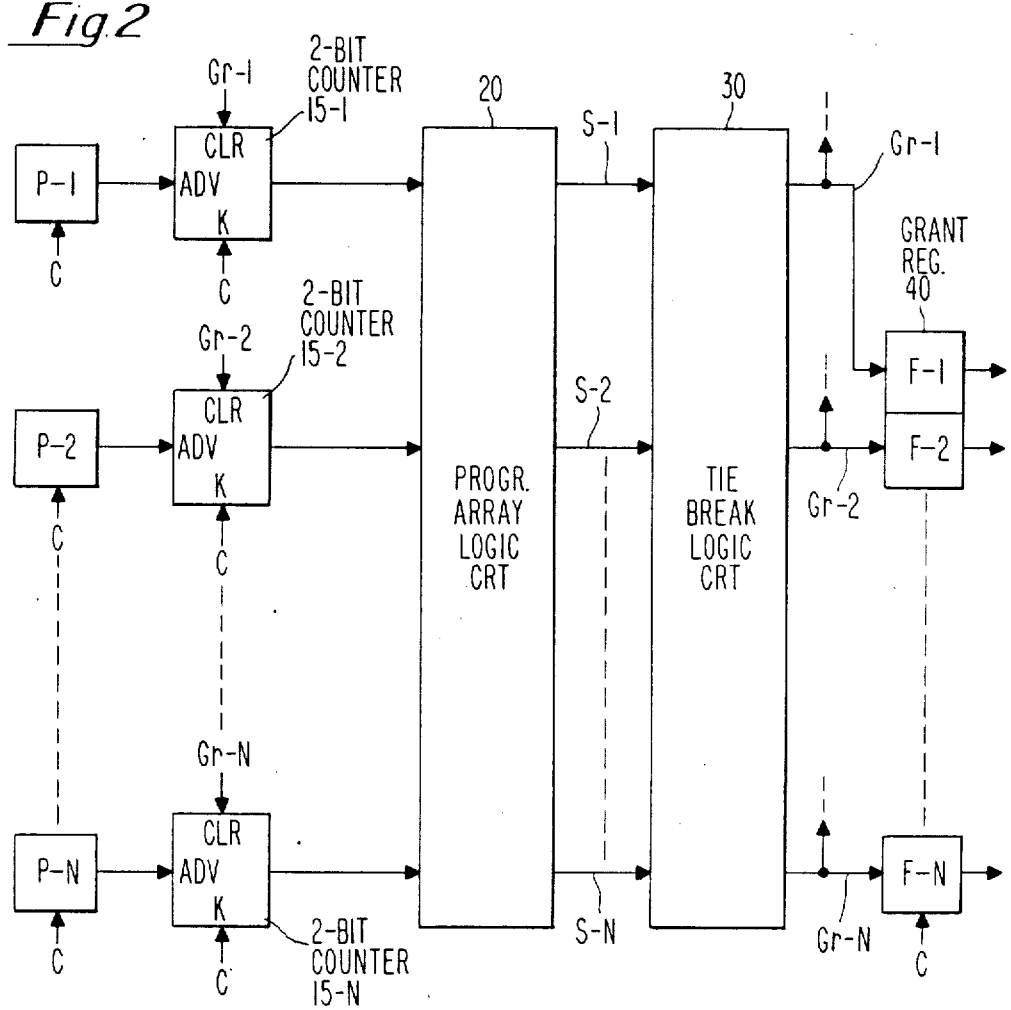
FIG. 2 is a block diagram illustrating a preferred embodiment in accordance with the invention for providing arbitration for a plurality of requestors.

Reference is now directed to FIG. 2 which illustrates an implementation of the arbitration circuitry 10 in FIG. 1 in accordance with the invention. As shown in FIG. 2, each of the processor request signals Req-1 to Req N is applied to a respective one of a plurality of synchronous counters 15-1 to 15-N. The maximum count provided for each of the counters 15-1 to 15-N is dependent upon the number of different processor request signals which must be handled. It has been found that the maximum count of each counter should be at least equal to the number of different processor request signals to be handled.

Figures 3, 4:
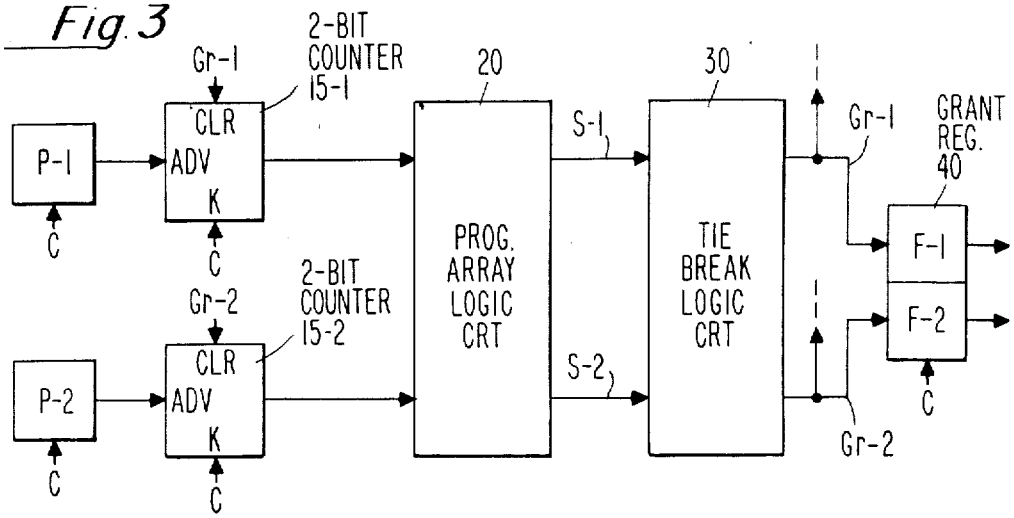
FIG. 3 is a block diagram illustrating two-processor arbitration in accordance with the invention.
FIG. 4 is a truth table illustrating the operating of the embodiment of FIG. 3.

As shown in FIG. 3, each of the counters 15-1 to 15-N includes a clock input K which receives the clock C, an advance count input Adv which receives a respective one of the request signals Req-1 to Req-N, and a clear input Clr which receives a respective one of the grant signals GR-1 to GR-N for clearing the counter when access is granted to its respective processor. It will thus be understood that operation of each counter is such that, when a processor desires access, its corresponding request signal (Req-1 to Req-N) becomes activated to cause its corresponding counter (15-1 to 15-N) to advance each clock cycle until the corresponding processor is awarded access, whereupon the counter is cleared to its initial count value at which it remains until its corresponding processor again activates its request signal.

It will be understood from the foregoing description of the counters 15-1 to 15-N that at each clock the counter with the highest count value represents the processor request that has been waiting the longest. In the preferred embodiment, the programmable array logic selection circuitry 20 in FIG. 2 is implemented using combinational logic made up of programmable array logic integrated circuitry. The operation of the programmable array logic selection circuitry 20 is such that its select outputs S-1 to S-N will be activated depending upon which of the corresponding request signals Req-1 to Req-N has been waiting the longest as determined by the output counts of the counters 15-1 to 15-N. If none of the request signals are activated (as indicated by all of the counters 15-1 to 15-N being at their initial count value), then none of the select outputs S-1 to S-N will be activated. If one or more of the request signals has been waiting the longest time (as indicated by the corresponding ones of the counters 15-1 to 15-N having the highest count value), then the corresponding ones of the select outputs S-1 to S-N of such request signals will become activated.

The purpose of the tie breaking logic circuitry 30 in FIG. 2 (to which the select outputs S-1 to S-N of the programmable array logic selection circuitry 20 are applied) is to break ties in the event that more than one of the select signals S-1 to S-N are activated in response to the counts of their corresponding counters having the same highest count value. It will be understood that various well known types of circuitry are available in the art for breaking ties. In the preferred embodiment, it is preferred to employ combinational logic which implements a simple fixed priority technique which breaks ties in favor of the activated select signal corresponding to the lowest numbered processor. For example, if both select signals S-1 and S-3 are activated, grant output signal Gr-1 will be activated to award access to processor P-1 (FIG. 1). The tie-breaking logic circuitry 30 in FIG. 2 may, for example, be implemented using conventional high speed SSI gate logic. Since the simple fixed priority scheme employed in the preferred embodiment can readily be provided using SSI gate logic by those skilled in the art, further details thereof will not be presented herein.

As pointed out previously, for the preferred embodiment being described herein in which processor requests are to be satisfied at a rate of one per clock cycle, it is important that the grant outputs GR-1 to GR-N from the tie-breaking logic circuitry 30 in FIG. 2 be valid before these outputs are sampled by the rise of the clock pulse occurring during each clock cycle (which will be assumed to be the active edge of the clock pulse for the purposes of this description). When the clock rises, the state of the grant outputs Gr-1 to Gr-N are clocked into respective flip flops F-1 to F-N of a grant register 40 for initiating access to the selected processor during the next cycle. The grant outputs Gr-1 to Gr-N are also respectively applied to the clear inputs Clr of their corresponding counters 15-1 to 15-N for causing a counter to be cleared during the same cycle that its corresponding grant signal is activated to award access to its corresponding processor.

The manner in which the programmable array selection circuitry 20 in FIG. 2 is designed to operate in response to the counters 15-1 to 15-N for the preferred embodiment being considered herein will now be considered in more detail. In order to provide a clear understanding of the design approach, it will initially be assumed that arbitration is to be provided for just the two processors P-1 and P-2 as illustrated in FIG. 3. In such a case only the two respective request signals Req-1 and Req-2 are applied to corresponding 2-bit counters 15-1 and 15-2 whose outputs are in turn applied to arbitration circuitry 20 for selectively activating the corresponding selection outputs S-1 and S-2 in response to the outputs of counters 15-1 and 15-2. For identification purposes, the two outputs of counter 15-1 in FIG. 2 are designated as A and B and those of counter 15-2 are designated as C and D.

FIG. 4 is a table illustrating the operation of the two processor arbitration example illustrated in FIG. 3. The "0" and "1" values shown for the counter outputs A, B, C, D represent the output count values of counters 15-1 and 15-2 in binary form. A 00 output state of a counter indicates that its corresponding processor is not requesting access, while output states 01, 10 and 11 indicate that the corresponding processor is requesting access and also how long it has been requesting access. The state of each of the selection signals S-1 and S-2 in FIG. 3 are also indicated by "1" and "0" designation, a "1" indicating an inactivated selection signal and a "0" indicating an activated selection signal.

For the 2-processor selection circuitry 20 in FIG. 3, the operations required by the table of FIG. 4 can advantageously be provided by programming its programmable array logic to implement the following Boolean equations:

$$S\text{-}1 = A'B' + A'C + B'CD$$

$$S\text{-}2 = CD' + CA + D'AB$$

It has been found that use of the above equations permits a fast, unexpectedly simple and economic program array logic implementation to be employed. In addition, the selection signal equations are symmetric, since the S-2 equation can be derived from the S-1 equation merely by substituting C for A, D for B, A for C and B for D. Furthermore, only simple AND, OR and INVERT logical elements are required.

It has been found that equations having patterns similar to the above equations for the two processor situation can advantageously be provided to implement the programmable array logic selection circuitry 20 for additional numbers of processors. For example, the equations for three and four processors are given below. Since the selection signal equations are symmetric, the equations for each case can be derived from the equation for S-1, as will be apparent from the two processor case above. Accordingly, only the S-1 equation is given below for each case. The counter outputs for the S-3, S-4 and S-5 counters (corresponding to processors P-3, P-4 and P-5, respectively) are designated as E and F for S-3, G and H for S-4 and I and J for S-5.

3 Processor Selection $$S - 1 = A'B' + A'C + A'E + B'CD + B'EF$$

4 Processor Selection $$S - 1 = A'B' + A'C + A'E + A'G +$$
$$B'CD + B'CD + B'EF + B'GH$$

5 Processor Selection $$S - 1 = A'B' + A'C + A'E + A'G + A'I + B'CD +$$
$$B'EF + B'GH + B'IJ$$

Although similar types of equations could be provided for additional numbers of processors using the two-bit counters 15-N (FIG. 2) for each processor, ambiguous operation could occur if too many processors are permitted to request access at the same time because the two-bit counter provides only four distinct counts (00,01, 10 and 11). Accordingly, for more than four processors, the counters 15-1 to 15-N in FIG. 2 should be at least 3-bit counters (providing the eight distinct counts 000, 001, 010, 011, 100, 101, 110 and 111) which will then be sufficient to provide unambiguous selection for up to eight processors. It will thus be seen that for unambiguous selection the number of distinct counts should at least be equal to the number of processors among which selection is to be made.

Figure 5:
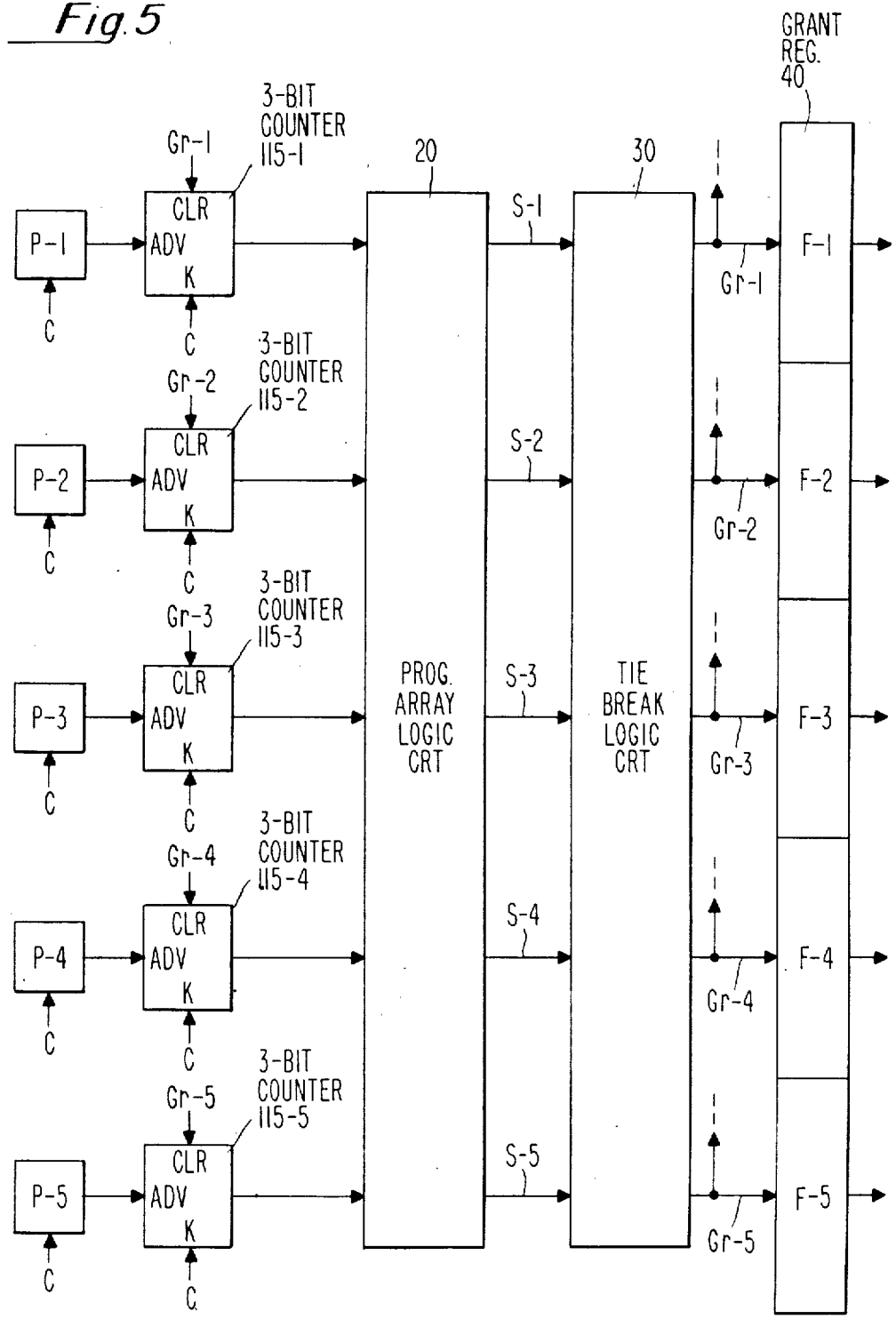
FIG. 5 is a block diagram illustrating five-processor arbitration in accordance with the invention.

As an example, FIG. 5 illustrates a five processor implementation using the five three bit counters 115-1 to 115-5. The equations for the selection signals S-1 to S-5 are symmetrical like those for the two-bit counters and have a similar pattern which permits the S-2, S-3, S-4 and S-5 selection equations to be derived from the S-1 equation which is illustrated below.

5 Processor Selection (3-bit Counters - FIG. 5)

$$S - 1 = A'B'C + A'D + A'G + A'J + A'M +$$
$$A'B'E + A'B'H + A'B'K + A'B'N +$$
$$B'DE + B'GH + B'JK + B'MN +$$
$$A'C'EF + A'C'HI + A'C'KL + A'C'NO +$$
$$B'C'DF + B'C'GI + B'C'JL + B'C'MO +$$
$$C'DEF + C'GHI + CJKL + CMNO$$

An example of typical operation of the five processor implementation of FIG. 5 is illustrated by the timing diagram of FIG. 6. It will be seen that FIG. 6 illustrates, for each of 14 clock cycles, which of processor request signals Req-1 to Req-5, selection signals S-1 to S-5, and grant signals Gr-1 to Gr-5 are activated during each cycle. FIG. 6 also illustrates for each cycle the output counts (in decimal) of the counters 115-1 to 115-5 and also the states of the grant register flip-flops F-1 to F-N. More specifically, an "X" in a box for a particular clock cycle for the signals Req-1 to Req-5, S-1 to S-5 and Gr-1 to Gr-5 indicates activation of the signal during that cycle, while a "-" indicates no activation during that cycle. The output count values of the counters 115-1 to 115-5 during each cycle are indicated by decimal numbers (0,1,2, etc.) provided in the respective boxes for that cycle.

The states of the flip-flops F-1 to F-5 of the grant register 40 during each cycle are indicated by providing a "1" or "0" in the corresponding box for each cycle, a "0" state for a given cycle indicating that access is given to the corresponding processor during that cycle.

As shown in FIG. 6, during clock cycle 1 only the processor P-1 requests access. Thus, only the corresponding counter 115-1 is advanced at the rise of the clock which begins cycle 2 so that counter 115-1 has a 1 count during cycle 2. Since all of the other counters 115-2 to 115-5 have 0 counts during cycle 2, only selection signal S-1 is activated by the programmable array logic selection circuitry 20 during cycle 2, which in turn causes the tie-breaking logic circuitry 30 to activate grant signal GR-1 during cycle 2, as shown in FIG. 6. As a result, the corresponding grant flip-flop F-1 will be switched to a "0" state by the rise of the clock which begins cycle 3 so as to cause F-1 to be in a "0" state during cycle 3 (as shown in FIG. 6), thereby granting access to processor P-1 during cycle 3. It will also be noted in FIG. 6 that the counter 115-1 is again at its initial 0 count during cycle 3 as a result of the activated grant signal GR-1 produced during cycle 2 having been fed back to the clear input Clr of its corresponding counter 115-1 in time for the counter 115-1 to be cleared to its initial count by the rise of the clock which begins cycle 3. Also note that the request signal Req-1 is not activated during cycle 3 because activation of a grant signal during a cycle also causes deactivation of the corresponding request signal during the next cycle.

Still with reference to FIG. 6, it will be seen that, during cycle 2, no processor requests access so that all of the counters 115-1 to 115-5 remain at their "0" count during cycle 3. As a result, none of the selection or grant signals S-1 to S-5 are activated during cycle 3, as indicated by a "-" in each corresponding box in FIG. 6. Thus, all of the access flip-flops F-1 to F-5 have "1" states during cycle 4 in which case no processor is granted access during cycle 4.

Although no processors requested access during cycle 2, it will be seen in FIG. 6 that both processors P-2 and P-4 request access during cycle 3. Thus, as shown, counters 115-2 and 115-4 have 1 count values during cycle 4 while the other counters 115-1, 115-3 and 115-5 remain at "0". As a result, selection signals S-2 and S-4 are activated by the programmable array logic selection circuitry 20 during cycle 4. Since the tie-breaking logic 30 gives priority to the lower-numbered processor, only grant signal Gr-2 is activated during cycle 4, causing the corresponding access flip-flop F-2 to be in a "0" state during cycle 5 so as to thereby give access to processor P-4 during cycle 5.

It will be understood from the previous discussion herein that, as shown in FIG. 6, request signal Req-2 will be deactivated and counter 115-2 will have a 0 count as a result of grant signal Gr-2 having been activated during cycle 4. However, since Gr-4 was not activated during cycle 4, counter 115-4 will have been advanced by the rise of the clock at the beginning of cycle 5 and will thus have a 2 count during cycle 5. Since all other counters have a 0 value during cycle 5, S-4 is activated during cycle 5, which in turn causes activation of grant signal Gr-4 during cycle 5, resulting in F-4 being in a "0" state during cycle 6 so that processor P-4 is given access during cycle 6, which is only one cycle later than processor P-3 was given access.

Continuing with the description of the typical operation illustrated in FIG. 6, it will be seen that the next processor requests occur during clock cycle 7 during which all five processors P-1 to P-5 request access. From the previous description taken in conjunction with the values Req-1 to Req-5, S-1 to S-5, Gr-1 to Gr-5 and F-1 to F-5 shown in FIG. 6, it will readily be understood how operation takes place over clock cycles 7 to 13 so as to result in processors P-1, P-2, P-3, P-4 and P-5 being granted access during successive clock cycles 9, 10, 11, 12 and 13.

As a final example, FIG. 6 illustrates the situation where processor P-1 again requests access during clock cycle 11. Again, it will readily be seen from FIG. 6 how processor P-1 is granted access during cycle 14, the next cycle following the granting of access to the last processor P-5 of the five processors P-1 to P-5 which requested access during cycle 7. It will be evident that the granting of processor P-1 access at this time is in accord with proper first-in-first-out operation since the latest request made by processor P-1 during cycle 11 occurred 4 cycles after all 5 processors had requested access during cycle 7. It will also be evident that operation is such that requests can be satisfied at a rate of one-per-cycle.

Although the description herein has been directed to particular preferred embodiments of the invention, it is to be understood that many modifications and variations can be made in the construction, arrangement, operation and/or use of the invention without departing from the scope and spirit of the invention. Accordingly, the present invention is to be considered as including all possible modifications and variations coming with in the scope of the appended claims.

What is claimed is:

1. Arbitration means for selecting which one of a plurality of requestors is to be granted access to a commonly shared means, said arbitration means comprising:
   a counting means for each requestor for providing binary count output signals indicative of how long its corresponding requestor has been waiting for access;
   means for periodically advancing each counting means in response to an access request from its respective requestor from an initial count until its respective requestor is granted access, the advancement of each counter occurring independently of access requests from other requestors;
   combinational logic means to which said binary count output signals from said counters are applied for producing a binary selection signal corresponding to each requestor, said combinational logic means being operative in response to the applied binary count output signals for activating a selection signal of a corresponding selector when no other of said requestors has been waiting longer for access; and
   tie-breaking logic means to which the selection signals from said combinational logic means are applied for producing a grant signal corresponding to each requestor, said tie-breaking logic means being operative in response to the applied selection signals to activate none of the grant signals when none of the applied selection signals are activated and to activate only one grant signal when one or more selction signals are activated.

2. The invention in accordance with claim 1, wherein said tie-breaking logic is constructed and arranged to activate said one grant signal based on a predetermined priority established for said requestors.

3. The invention in accordance with claim 1, wherein said combinational logic means comprises programmable array logic circuitry.

4. The invention in accordance with claim 3, wherein said programmable array logic circuitry is comprised of AND, OR and INVERT logical elements.

5. The invention in accordance with claim 3, wherein the construction and arrangement of said programmable array logic circuitry is such that the Boolean equations defining the logical relationships between the selection signals and said binary count output signals are symmetric.

6. The invention in accordance with claim 1, wherein the maximum count of each counting means is at least equal to the number of requestors.

7. The invention in accordance with claim 1, wherein each grant signal is fed back to its corresponding counting means for causing the counting means to be cleared to its initial count in response to activation of the corresponding grant signal.

8. The invention in accordance with claim 1, wherein said means for periodically advancing each counting means comprises a periodic clock signal which is applied to each of said counting means, said counting means being operative in response to each clock signal to advance its count if its corresponding requestor is requesting access at that time.

9. The invention in accordance with claim 8, wherein said binary count signals are applied in parallel to said combinational logic means, and wherein said combinational logic means and said tie-breaking logic means are capable of operating in response to the applied binary count signals so that a grant signal can be activated within one period of said clock signal.

10. The invention in accordance with claim 8, including means for feeding back each grant signal to its corresponding counting means so that an activated grant signal will cause its corresponding counter to be cleared to its initial count at the occurrence of the next clock signal so as to thereby permit a grant signal to be produced at a rate of one per clock period.

11. A method for selecting which one of a plurality of requestors will be granted access to a commonly shared means, said method comprising:
    producing a periodically occurring clock signal for defining clock periods;
    for each requestor, counting beginning at an initial count value the number of clock signals for which the requestor is requesting access without access being granted, the count value reached during each clock period being indicative of how long the corresponding requestor has been waiting for access;
    for each requestor, activating a corresponding selection signal during each clock period when no other of said requestors has been waiting longer for access;
    during each clock period, activating no more than one grant signal and then only if at least one selection signal is activated during that clock period, the grant signal which is activated during a clock period corresponding to the selection signal which is activated during that clock period if only one selection signal is activated, and corresponding to one of the selection signals activated during that clock period if more than one selection signal is activated during that clock period.

12. The invention in accordance with claim 11, wherein the particular grant signal which is activated during a clock period if more than one selection signal is activated during that clock period is chosen based on a predetermined priority established for said requestors.

13. The invention in accordance with claim 12, including the step of causing the counting provided for each requestor to be restarted at its initial count value for the next clock period following a clock period during which the corresponding grant signal is activated.

* * * * *